(12) United States Patent
May et al.

(10) Patent No.: US 7,521,923 B2
(45) Date of Patent: Apr. 21, 2009

(54) MAGNETIC DISPLACEMENT TRANSDUCER

(75) Inventors: Lutz Axel May, Gelting (DE); Georg Cuntze, Schwaben (DE)

(73) Assignee: Abas, Incorporated, Chicago, IL (US)

( * ) Notice: Subject to any disclaimer, the term of this patent is extended or adjusted under 35 U.S.C. 154(b) by 0 days.

(21) Appl. No.: 10/419,995

(22) Filed: Apr. 22, 2003

(65) Prior Publication Data

US 2004/0036467 A1    Feb. 26, 2004

(30) Foreign Application Priority Data

Apr. 23, 2002 (GB) ................. 0209240.1
Oct. 29, 2002 (GB) ................. 0225160.1

(51) Int. Cl.
*G01B 7/14* (2006.01)
*H01F 5/00* (2006.01)

(52) U.S. Cl. .............. 324/207.24; 324/207.16

(58) Field of Classification Search ........... 324/207.2, 324/207.21–207.26, 207.12, 207.13, 253, 324/207.15–207.18
See application file for complete search history.

(56) References Cited

U.S. PATENT DOCUMENTS

| | | | | |
|---|---|---|---|---|
| 3,332,009 | A | * | 7/1967 | Seale ............... 324/207.14 |
| 5,198,762 | A | * | 3/1993 | Shimoe et al. ....... 324/207.21 |
| 5,589,769 | A | * | 12/1996 | Krahn ............... 324/207.26 |
| 6,097,183 | A | * | 8/2000 | Goetz et al. ........ 324/207.12 |
| 6,181,128 | B1 | * | 1/2001 | Schroeder .......... 324/207.21 |
| 6,265,867 | B1 | * | 7/2001 | Fowler ............. 324/207.25 |
| 6,300,758 | B1 | * | 10/2001 | Griffen et al. ..... 324/207.21 |
| 6,489,771 | B1 | * | 12/2002 | Farque ................. 324/326 |
| 6,507,189 | B2 | * | 1/2003 | Woolsey et al. ..... 324/207.26 |
| 6,563,306 | B2 | * | 5/2003 | Sato ................ 324/207.2 |
| 6,573,710 | B1 | * | 6/2003 | Santos et al. ...... 324/207.25 |

(Continued)

FOREIGN PATENT DOCUMENTS

DE    43 41 810 A    6/1995

(Continued)

OTHER PUBLICATIONS

International Preliminary Examining Authority; International Search Report issued Aug. 12, 2003, with respect to International Patent Application No. PCT/EP03/04355 filed on Apr. 23, 2003.

*Primary Examiner*—Reena Aurora
*Assistant Examiner*—Kenneth J Whittington
(74) *Attorney, Agent, or Firm*—Blank Rome LLP

(57) ABSTRACT

A transducer for measuring a displacement along an axis of movement of a first part relative to a second part, comprises a magnetic source for generating a magnetic field mounted to the first part, and a plurality of magnetic field sensing devices mounted to the second part to be movable relative to the magnetic field generated by the magnetic source. The sensing devices are spaced in the direction of the axis. A circuit arrangement is provided to which the sensing devices are connected to generate an output signal dependent on contributions from the sensing devices of the plurality. The magnetic source has North and South poles oriented in the direction of the axis. The sensing devices are each oriented to respond to an axially-directed component of magnetic field, and comprise at least two axially-spaced sensing devices whose contributions to the output signal are combined in a subtractive fashion.

6 Claims, 16 Drawing Sheets

U.S. PATENT DOCUMENTS 6,653,830 B2 * 11/2003 Luetzow ................ 324/207.21
6,674,280 B1 * 1/2004 Goetz et al. ............ 324/207.21
7,009,386 B2 * 3/2006 Tromblee et al. ........ 324/207.2

FOREIGN PATENT DOCUMENTS

| DE | 44 30 467 A | | 10/1995 | |
|----|-------------|---|---------|---|
| EP | 0 668 118 A | | 8/1995 | |
| JP | 5-175483 | * | 5/1993 | ............ 324/207.13 |
| WO | WO 98/52063 | | 11/1998 | |
| WO | WO 02 23146 A | | 3/2002 | |

* cited by examiner axial coil(s), axial oriented magnet radial coil(s), axial oriented magnet sum of separate signals

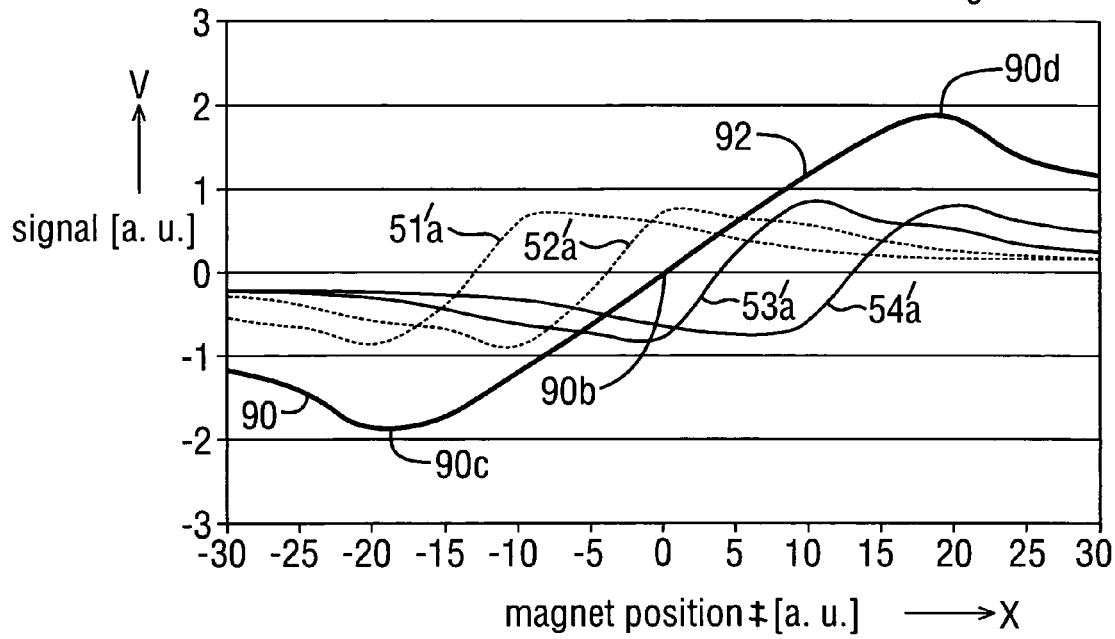
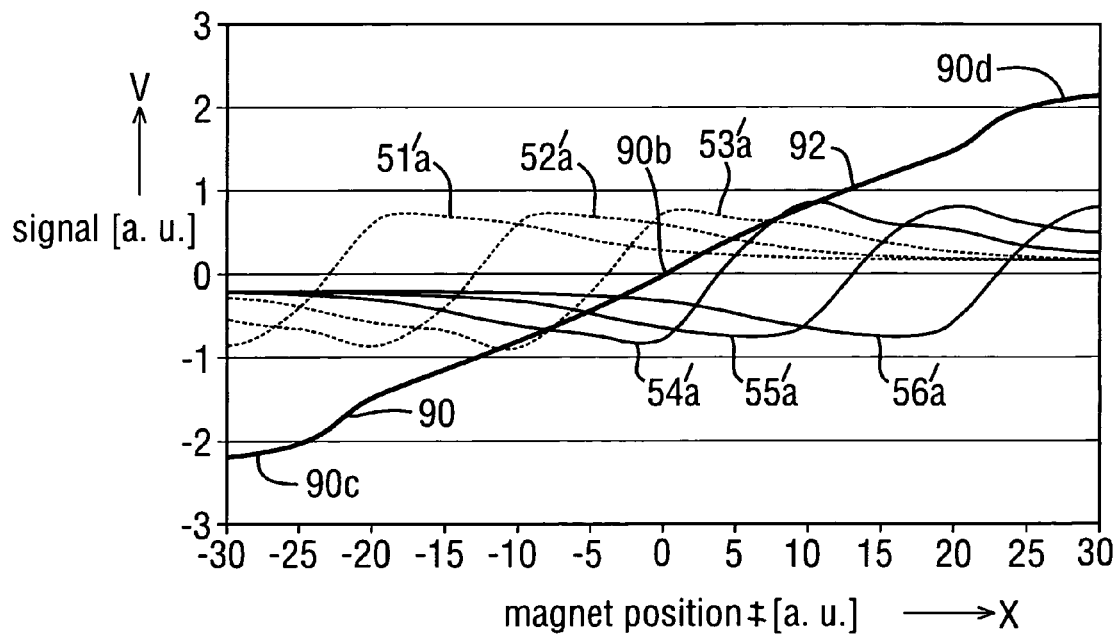

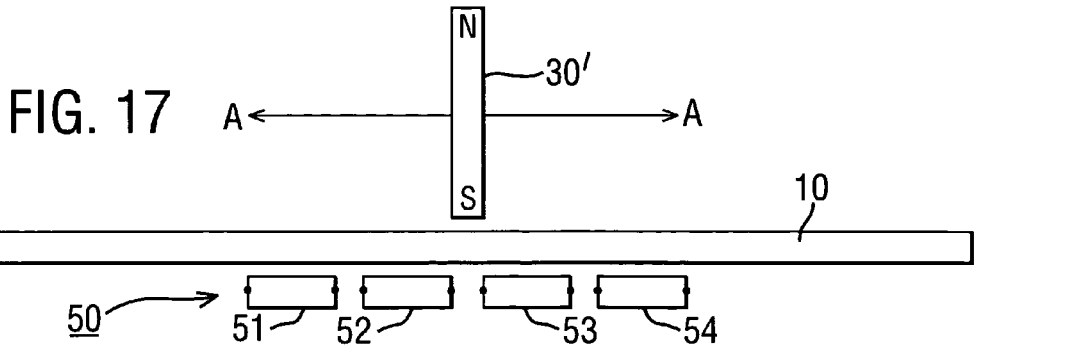
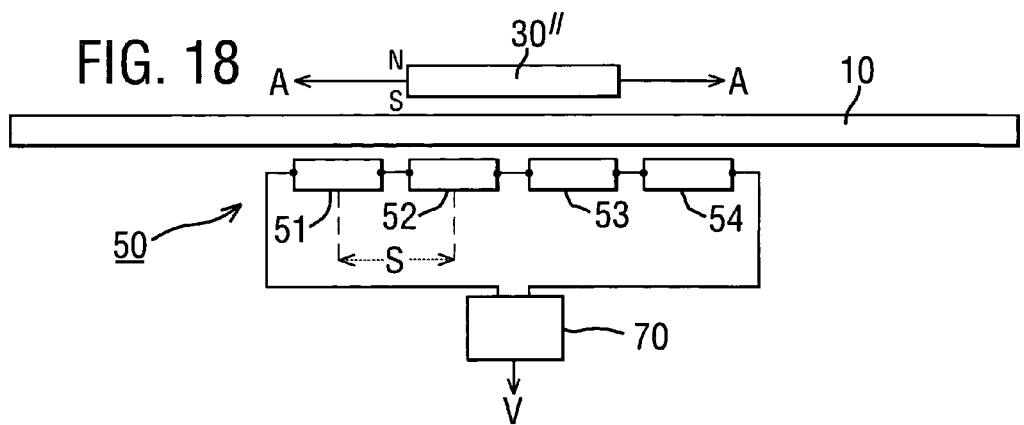
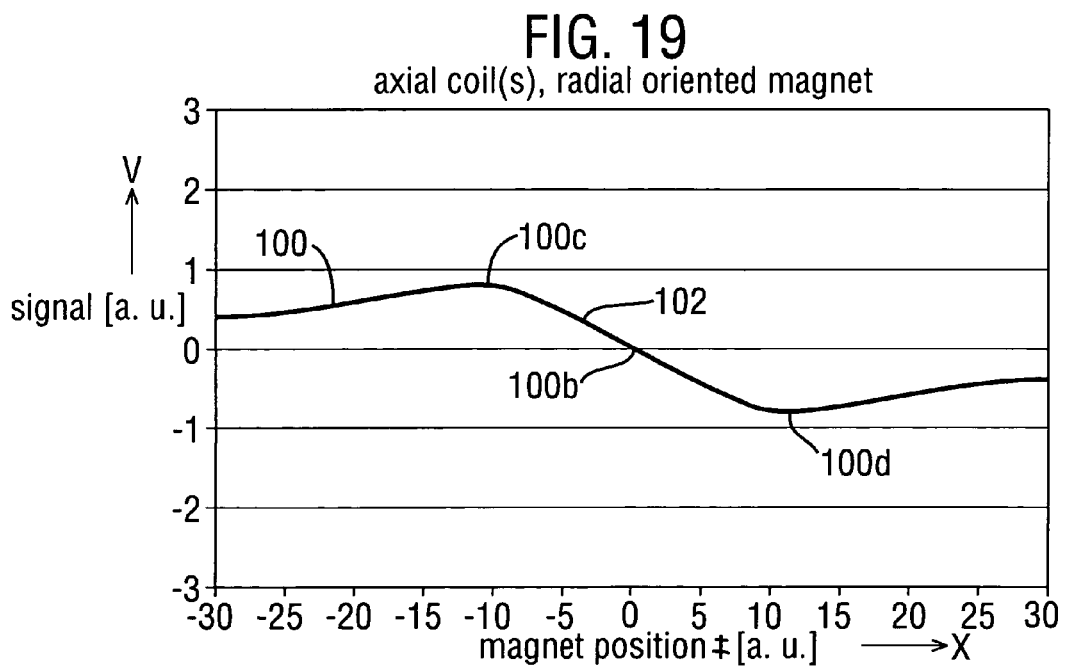

sum of separate signals

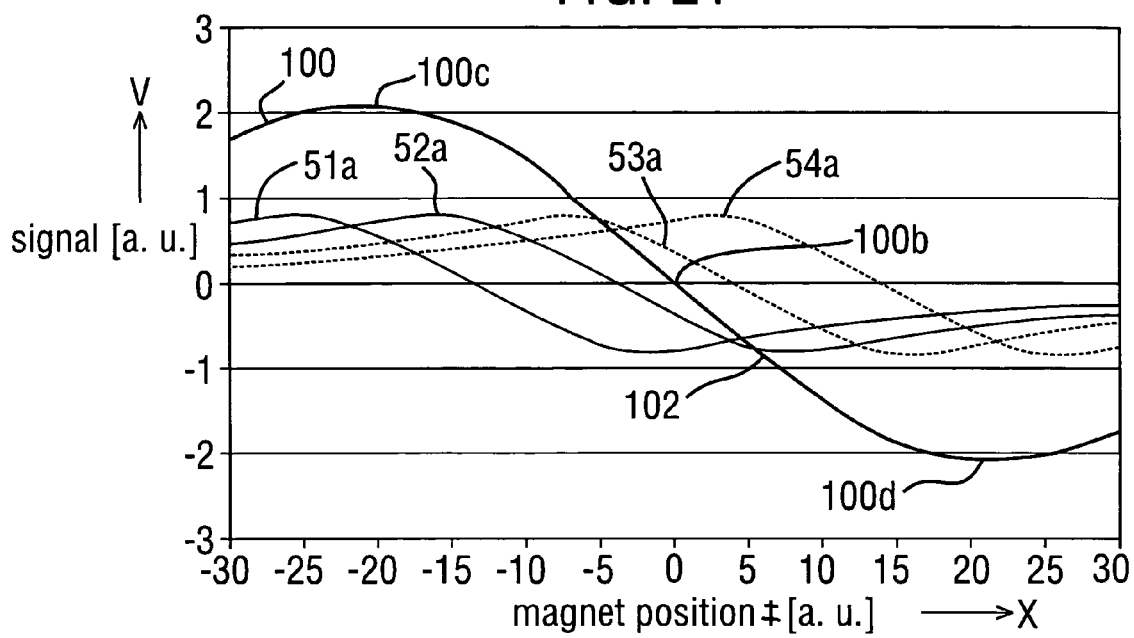
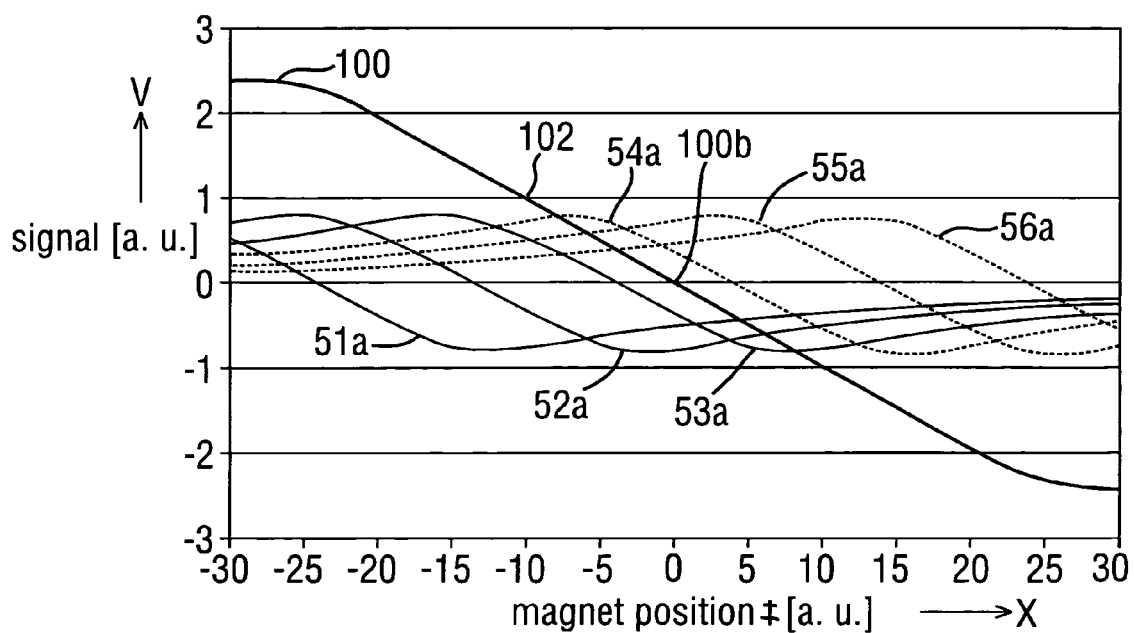

radial coil(s), radial oriented magnet difference of the sum of all left coils to the sum of all right coils

MAGNETIC DISPLACEMENT TRANSDUCER

FIELD OF THE INVENTION

This invention relates to a displacement measurement transducer, particularly for linear displacement or position measurement.

BACKGROUND OF THE INVENTION

There are numerous technologies used to measure length or change of length based on optical, acoustic, electrical or magnetic principles. A special area of measurement is that of a non-contact transducer measurement of displacement or position between two relatively movable parts. We are not aware of any non-contact transducer which can be used with an intervening material between a signal source and sensor, which material affects the characteristic of the signals.

The invention has been developed in relation to measuring the linear movement of a clutch mounted on a gear shaft housing. The invention is considered to have more general utility. The invention utilises magnetic transducer technology.

In applying such technology to measurement of clutch movement mentioned above, it may be the case that the gear shaft housing is of a ferromagnetic material and that the transducer has to "see through" the material of the housing with a magnetic source positioned on one side and a magnetic detector positioned on the other.

The magnetic source will be described in terms of one or more permanent magnets. It will be understood that electromagnets may also be used. The magnetic detector will be described in terms of one or more sensor devices. Suitable devices include the magnetoresistive, Hall effect and saturating core (inductor) type. The present invention has been implemented in a signal conditioner and processing circuit (SCSP) of the kind described in published PCT application WO98/52063. In such an SCSP circuit plural sensor devices of the saturating core type can be connected in additive (summing) or subtractive (differential) fashion.

A first aspect of the invention addresses the problem set forth above. Further aspects of the present invention are directed to further developments of the technology described in connection with the first aspect of the invention with particular attention being given to transducer configurations providing a linear transfer function between a displacement-representing output and the displacement being measured. As has already been indicated magnetic displacement transducers embodying the invention are of general utility.

SUMMARY OF THE INVENTION

Aspects and features of this invention for which protection is sought are set forth in the claims following this description.

According to a first aspect there is provided a transducer for measuring a displacement of a first part relative to a second part along an axis of movement comprising:
  at least one magnetic source mounted to the first part and at least one magnetic field sensor mounted to the second part to be movable relative to the magnetic field generated by the source,
  said at least one magnetic detector being connected in a circuit producing an output signal which is a function of the relative position of the first and second parts,
  wherein,
  one of said at least one magnetic source and said at least one magnetic field sensor comprises two devices spaced in the direction of relative movement such that said output signal is a monotonic function of the relative position of the first and second parts over a range of displacement.

According to a second aspect there is provided a transducer for measuring a displacement along an axis of movement of a first part relative to a second part, comprising:
  a magnetic source for generating a magnetic field mounted to the first part,
  a plurality of magnetic field sensing devices mounted to the second part to be movable relative to the magnetic field generated by the magnetic source, said plurality of sensing devices being spaced in the direction of said axis, and
  a circuit arrangement to which said plurality of sensing devices are connected to generate an output signal dependent on contributions from the sensing devices of the plurality;
  wherein:
  said magnetic source has North and South poles oriented in the direction of said axis,
  the sensing devices of said plurality are each oriented to respond to an axially-directed component of magnetic field, and
  the plurality comprises at least two axially-spaced sensing devices whose contributions to the output signal are combined in a subtractive fashion.

According to a third aspect there is provided a transducer for measuring a displacement along an axis of movement of a first part relative to a second part, comprising:
  a magnetic source for generating a magnetic field mounted to the first part,
  a plurality of magnetic field sensing devices mounted to the second part to be movable relative to the magnetic field generated by the magnetic source, said plurality of sensing devices being spaced in the direction of said axis, and
  a circuit arrangement to which said plurality of sensing devices are connected to generate an output signal dependent on contributions from the sensing devices of the plurality;
  wherein:
  said magnetic source has North and South poles oriented in the direction of said axis, and
  the sensing devices of said plurality are each oriented to respond to a radially-oriented component of said magnetic field with respect to the direction of-said axis, and
  the plurality comprises at least two axially-spaced sensing devices whose contributions are combined in an additive fashion.

According to a fourth aspect there is provided a transducer for measuring a displacement along an axis of movement of a first part relative to a second part, comprising:
  a magnetic source for generating a magnetic field mounted to the first part,
  a plurality of magnetic field sensing devices mounted to the second part to be movable relative to the magnetic field generated by the magnetic source, said plurality of sensing devices being spaced in the direction of said axis, and
  a circuit arrangement to which said plurality of sensing devices are connected to generate an output signal dependent on contributions from the sensing devices of the plurality;
  wherein:
  said magnetic source has North and South poles oriented radially with respect to said axis, and the sensing devices of said plurality are each oriented to respond to an axially-directed component of said magnetic field, and the plurality comprises at least two axially-spaced sensing devices whose contributions are combined in an additive fashion According to a fifth aspect there is provided a transducer for measuring a displacement along an axis of movement of a first part relative to a second part, comprising:

a magnetic source for generating a magnetic field mounted to the first part, a plurality of magnetic field sensing devices mounted to the second part to be movable relative to the magnetic field generated by the magnetic source, said plurality of sensing devices being spaced in the direction of said axis, and a circuit arrangement to which said plurality of sensing devices are connected to generate an output signal dependent on contributions from the sensing devices of the plurality;

wherein:

said magnetic source has North and South poles oriented radially with respect to said axis, and the sensing devices of said plurality are each oriented to respond to a radially-directed component of said magnetic field, and the plurality comprises at least two axially-spaced sensing devices whose contributions are combined in a subtractive fashion.

According to a sixth aspect there is provided a transducer for measuring a displacement along an axis of movement of a first part relative to a second part, comprising:

a magnetic source for generating a magnetic field mounted to the first part, a plurality of magnetic field sensing devices mounted to the second part to be movable relative to the magnetic field generated by the magnetic source, said plurality of sensing devices being spaced in the direction of said axis, and a circuit arrangement to which said plurality of sensing devices are connected to generate an output signal dependent on contributions from the sensing devices of the plurality;

wherein:

said magnetic source has North and South poles oriented in a given direction with respect to said axis, the sensing devices of said plurality are each oriented to respond to a component of said magnetic field in said given direction, and the plurality comprises at least two devices whose contributions are combined in a subtractive fashion.

According to a seventh aspect there is provided a transducer for measuring a displacement along an axis of movement of a first part relative to a second part, comprising:

a magnetic source for generating a magnetic field mounted to the first part, a plurality of magnetic field sensing devices mounted to the second part to be movable relative to the magnetic field generated by the magnetic source, said plurality of sensing devices being spaced in the direction of said axis, and a circuit arrangement to which said plurality of sensing devices are connected to generate an output signal dependent on contributions from the sensing devices of the plurality;

wherein:

said magnetic source has North and South poles oriented in a given direction with respect to said axis, the sensing devices of said plurality are each oriented to respond to a component of said magnetic field normal to said given direction, and the plurality comprises at least two devices whose contributions are combined in an additive fashion.

The invention will be particularly described in relation to the linear measurement of movement of a clutch mechanism, itself movable along a linear path. The first aspect of the present invention will be described with reference to FIGS. 1 to 5 of the accompanying drawings and the further aspects of the invention are then described with reference to FIGS. 6a to 27 of the accompanying drawings.

BRIEF DESCRIPTION OF THE DRAWINGS

In the accompanying drawings:

FIG. 15 illustrates the response pertaining to all four of the sensor devices of FIG. 12 connected additively in series;

FIG. 16 illustrates the response pertaining to an extension of the configuration of FIG. 12 to six spaced sensor devices forming two symmetrical groups of three devices each, all devices being connected additively in series;

FIG. 17 shows one embodiment of a third transducer configuration using a radially-oriented magnet of large aspect ratio and a plurality of spaced axially-oriented sensor devices;

FIG. 18 shows a second embodiment of the third transducer configuration using a radially-oriented magnet of small aspect ratio and a plurality of spaced axially-oriented sensor devices connected in additive series;

FIG. 19 illustrates the response pertaining to a single one of the sensor devices of FIG. 18;

FIG. 20 illustrates the response pertaining to an adjacent two of the sensor devices of FIG. 19 connected in additive series as shown in FIG. 20a;

FIG. 21 illustrates the response pertaining to all four of the sensor devices of FIG. 18 connected additively in series;

FIG. 22 illustrates the response pertaining to an extension of the configuration of FIG. 18 to a sensor assembly of six sensor devices considered in two symmetrical groups and all connected in series;

FIG. 25 illustrates the response pertaining to two adjacent sensor devices of FIG. 23 connected in subtractive series as shown in FIG. 25a;

FIG. 26 illustrates the response pertaining to all four sensor devices of FIG. 23 connected in two symmetrical groups as shown in FIG. 25a; and FIG. 27 illustrates the response pertaining to an extension of the sensor assembly of FIG. 23 to six sensor devices connected in two groups of three devices as shown in FIG. 27a.

DESCRIPTION OF THE PREFERRED EMBODIMENTS

Figure 1:
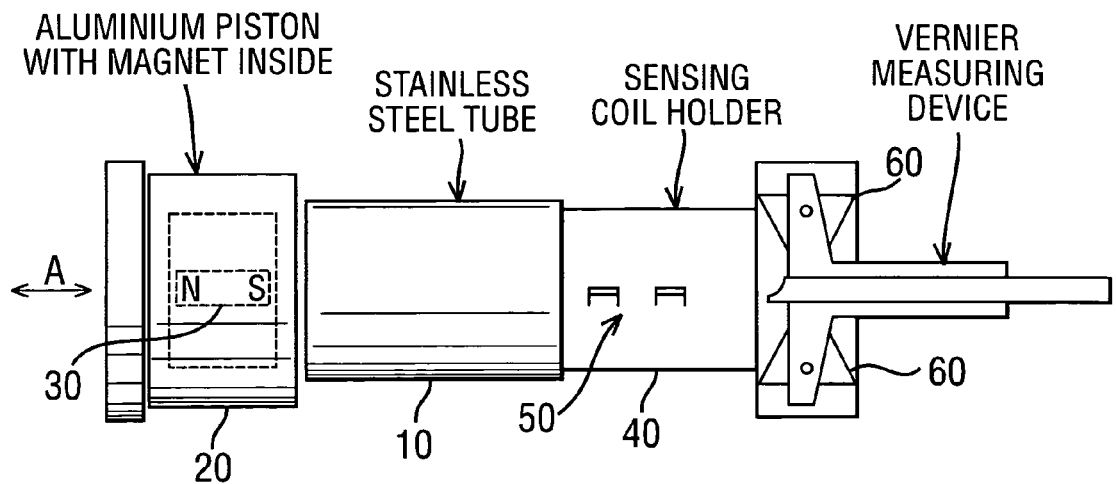
FIG. 1 illustrates, in exploded view, elements of the assembly for a clutch mechanism as set up in an experimental rig.

FIG. 1 shows in an exploded view elements of a transducer of the invention applied to a clutch mechanism and in which an arrangement of magnetic source and magnetic field sensor devices is shown diagrammatically.

Figure 2A:
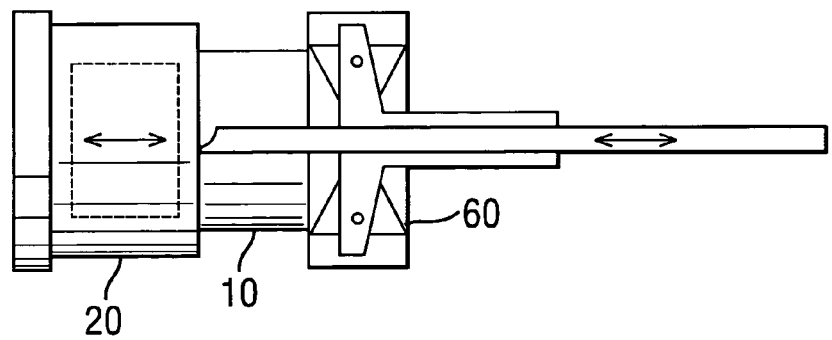
FIGS. 2a and 2b are views of the assembly of FIG. 1 with different positions of the clutch mechanism.
Figure 2B:
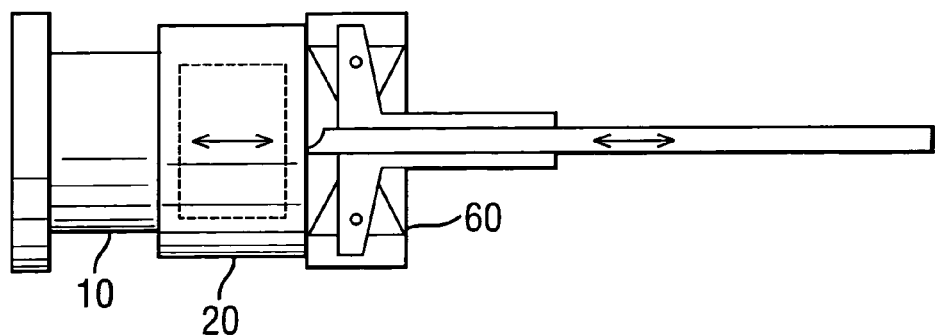

A tube 10, for example the housing of a gear shaft, has a clutch mechanism 20 slidably mounted on it for movement in the axial direction A-A of the tube, that is the mechanism is mounted for linear movement. The clutch mechanism carries a permanent magnet or assembly of magnets 30. Magnet 30 is located within the mechanism 20 which will normally have a magnetically permeable housing, as of aluminium. Fitted within the tube is a holder 40 for one or more sensing coils 50 which are located off-axis adjacent the wall of the tube 10 to which the magnet 30 is proximate. It will be understood that the sensor holder 40 is mounted within the tube 10 with the clutch mechanism 20 encircling the tube. FIGS. 2a and 2b show the assembly with the clutch mechanism 20 in different axial positions measurable by an auxiliary measuring device 60 fixed with respect to tube 10 to provide a reference measurement of the axial position of mechanism 20 in the test rig. In the application under consideration, the mechanism is movable in the direction A-A by say ±30 mm. As will be discussed further below, the transducer is designed to provide an output signal which is a measure of this axial displacement and an important factor which then arises is the linearity of the transducer transfer function.

The magnet 30 is mounted at say 1.7 mm from the outer surface of tube 10. The sensor devices 50 are mounted to be in contact with or very closely adjacent the inner surface of tube 10.

Depending on the application, the tube 10 may be of say aluminium or plastic in which case it is readily permeated by the field of magnet 30 and the sensors 50 "see" the magnet. However, the tube may be of a ferromagnetic material, e.g. steel. It has been found that sufficient field will penetrate through the tube but satisfactory operation requires the magnetic source and detector to be placed closely adjacent on opposite sides of the tube wall. The ferromagnetic material should have a low remanence to avoid the establishment of region(s) of permanent magnetisation in the tube.

The sensor device(s) 50 are connected into an SCSP circuit (not shown) for obtaining a signal dependent on the detected field strength and, more particularly, a signal which utilises the field gradient as a function of axial position. To this end the output obtained is a function of both the field pattern as a function of axial distance—that is the field pattern relative to a datum fixed for the source (e.g. assume the mechanism 20 is stationary)—and the response pattern of the detector—that is the sensitivity of the detector as a function of axial position relative to a fixed datum for the sensor. This response pattern is also dependent on the orientation of the sensor device(s) and on their dimensions which affects the resolution of a given device. Typically saturating core sensors have a maximum sensitivity along the axis of the inductor and a physical length of about 6 mm. The source field pattern is also dependent on the orientation of the permanent magnet(s) and upon magnet dimensions.

What is generally desired is to find a combination of these factors which leads to the most linear transfer function over the desired range of displacement or travel. Non-linear functions can be used by calibration of the transducer, e.g. by computer processing using a look-up table or defined conversion equation. Non-monotonic functions should be avoided.

Figure 3:
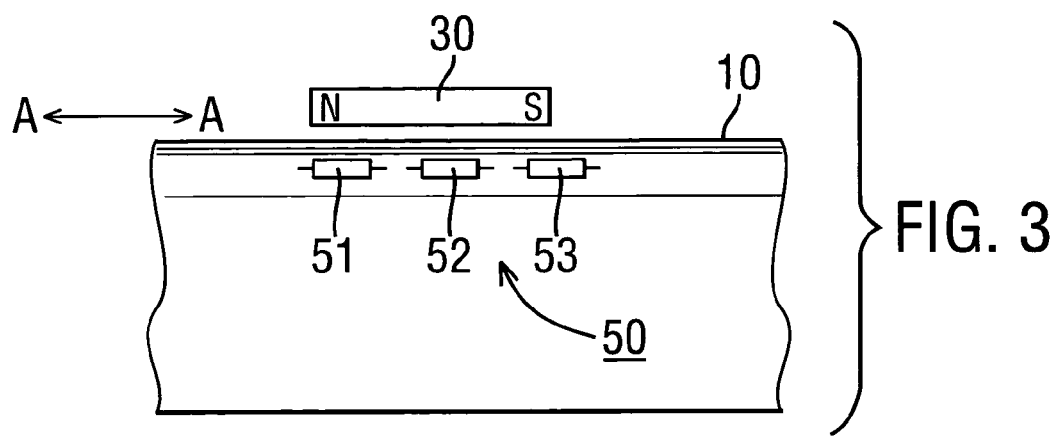
FIG. 3 illustrates one magnetic source and magnetic field detector arrangement.

FIG. 3 illustrates a longitudinal section through a tube 10 externally of which a magnet 30 is mounted, say 30×10×3 mm in dimension (length by width x depth). In this case the magnet is mounted parallel to the axis of displacement (axially oriented). Within the tube at least one, and preferably a plurality of sensor devices 51, 52, 53 etc. are mounted. They are axially oriented (maximum axis of sensitivity in the direction of relative movement A-A) and are axially spaced. Two such devices can be connected in differential fashion into a single SCSP to obtain a linearised response. Other arrangements may use additively connected devices or combinations of additively connected devices.

Figure 4:
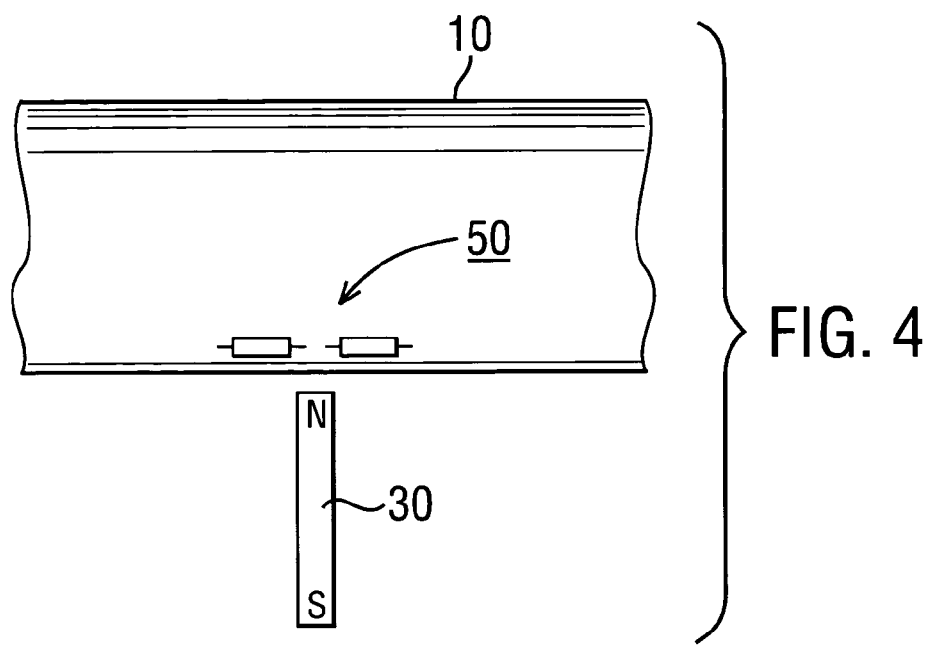
FIG. 4 illustrates another such arrangement in which the magnetic source and magnetic detector are oriented perpendicularly to one another in the plane of the drawing.

Transducers are obtainable using a radially-oriented magnet and axially-oriented sensor devices as shown in FIG. 4 or vice versa. Where radially-oriented sensor devices are used they are still spaced in the axial direction.

Figure 5:
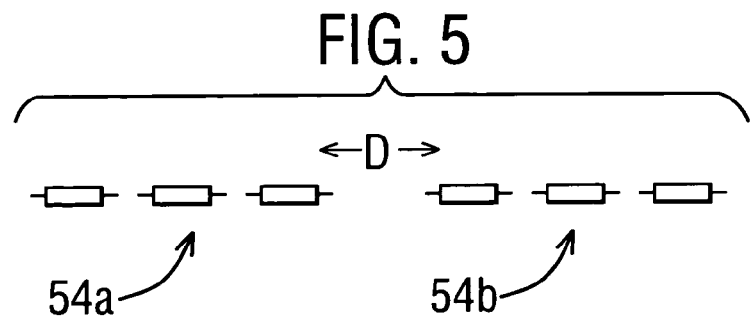
FIG. 5 shows another arrangement of sensor devices.

One arrangement of sensor devices is shown in FIG. 5 in which six axially-oriented devices are used in two groups 54a, 54b all three with a spacing D between the groups that is greater than the device spacing with each group. All the devices are connected additively into one SCSP circuit.

The magnets employed may be of arcuate form to fit a tube. Although the application of the transducer has been described in relation to a three-dimensional, circular cross-section embodiment, the teachings herein can be applied to essentially planar systems. It is not necessary to have any intervening component between the magnetic source and detector. They could be arranged for relative displacement in air or other ambient medium.

What is contemplated in accord with the disclosure thus far is:

a) a transducer for measuring a displacement of a first part relative to a second part along an axis of movement comprising:

at least one magnetic source mounted to the first part and at least one magnetic field sensor mounted to the second part to be movable relative to the magnetic field generated by the source, said at least one magnetic detector being connected in a circuit producing an output signal which is a function of the relative position of the first and second parts, wherein, one of said at least one magnetic source and said at least one magnetic field sensor comprises two devices spaced in the direction of relative movement such that said output signal is a monotonic function of the relative position of the first and second parts over a range of displacement.

b) A transducer as set forth in paragraph a) in which said at least one magnetic source is radially-oriented and said at least one magnetic field sensor device is oriented in the direction of displacement or vice versa.

c) A transducer as set forth in paragraph a) or b) in which said at least one sensor device comprises a plurality of devices spaced in the direction of relative displacement.

d) A transducer as set forth in paragraph c) in which said plurality of devices are in two groups of devices in which the devices in the groups are spaced from each other, preferably by a distance greater than any device spacing within the groups.

e) A transducer as set forth in any one of paragraphs a) to d) in which ferromagnetic material is disposed between said at least one magnetic source and said at least one magnetic field sensor and the source(s) and sensor(s) are mounted in close proximity on opposite sides of the ferromagnetic material.

The second aspect of the present invention is concerned with further developments in relation to configurations of magnetic source(s) and magnetic sensor device(s) which demonstrate a linear response characteristic. The invention is also concerned with a magnetic source structure for controlling the magnetic flux to which the sensor device(s) react.

The present invention enables useful linear responses to be developed for a range of displacement. Particular consideration is given to the following magnetic source and magnetic field sensor combinations with respect to an axis of relative movement:

a) Axial magnet—Axial Sensor; basic response of a hump type b) Axial magnet—Radial Sensor: basic response includes a linear slope portion c) Radial magnet—Axial Sensor: basic response includes a linear slope portion d) Radial magnet—Radial Sensor: basic response of a hump type.

Basic responses relate to the response of a single sensor device.

The hump type basic responses can be transformed or converted to a response having a linear slope portion when using a plurality of sensors the combining of the contributions of which includes a subtraction (difference) function.

The linear slope portion basic responses can be enhanced by additively combining the contributions of a plurality of sensors.

Some general conclusions arising out of the transducer configurations discussed below are given in the SUMMARY at the end of this description.

The preceding description has already referred to transducers in which a magnet is used in combination with a plurality of sensor devices. What will be discussed below is a systematic way of creating a desired transfer function, and particularly a transfer function which has a linear characteristic over a large range of displacement. Potentially desirable characteristics can be developed and explored using computer simulation or modelling which has the benefit of enabling the effect of variation of parameters to be readily investigated. More specifically, the overall transfer function of a combination of one or more magnets with one or more sensor devices can be investigated from the initial stand point of the field distribution due to a single magnet and the response characteristic of a single sensor device.

Consideration can be given to transducers incorporating the following:

Magnetic Source 1) one or more magnets which are axially-oriented and in which the axial length—separation of the poles—is large relative-to the cross-section dimensions of the magnet;

2) one or more magnets which are radially-oriented and in which
 a) the radial length—separation of the poles—is large relative to the axial dimension of the magnet (referred to as a large aspect ratio magnet), or
 b) the radial length—separation of the poles—is small relative to the axial dimension of the magnet (referred to as a small aspect ratio magnet);

Magnetic Sensor Assembly 3) one or more sensor devices which are axially-oriented;

4) one or more sensor devices which are radially-oriented.

The above four configurations are not exhaustive but represent the most likely orientations of magnets and sensor devices. The transducer configurations specifically described below are for a single magnet used in combination with a plurality of sensors. In describing the combining of contributions from plural sensor devices, the devices will be taken to be of the saturating core type and connected in series to a single SCSP circuit of the kind disclosed in WO98/52063. Where appropriate to discuss a basic form of response a single sensor device is connected to the SCSP.

A magnet whose length between the poles is large compared with the cross-section dimensions may be conveniently referred to as having a high aspect ratio: conversely a magnet whose length between the poles is small relative to its cross-section dimensions has a low aspect ratio.

As has already been pointed out, where the sensor devices are of the saturating core type, they can be connected in series into an SCSP circuit, the polarity of the connection determining whether the result is additive or subtractive (sum or difference connection).

Before discussing some particular magnetic source/detector configurations in detail, other aspects of the transducer operation will be considered and some amplification made of information given above.

In cases where the transducer is to see through an intervening ferromagnetic material, it is preferred that the material be a soft magnetic material with low remanent flux density and low hysteresis and thus low coercivity. Materials that meet this requirement include pure iron, Mumetal and Permalloy, together with simple low carbon steels or material used for transformer core laminations having a mainly ferrite grain structure.

It will, of course, be recognised that the choice of the intervening material may be determined by mechanical properties related to practical engineering requirements. The thickness of the intervening material separating the source(s) from the sensor(s) is also relevant.

The magnetic field or flux distribution detected by a sensor has a local vector direction associated as is well known for plots of the magnetic flux lines in the vicinity of a magnet. Furthermore, the local vectors may vary with the dimension of the magnet.

Consequently there are a number of factors which influence the overall performance and sensitivity of a complete system. To those already enumerated must be added the response of the sensor device(s). Mention has been made of Hall effect sensors, magnetoresistive sensors of which there are various types, and saturating core sensors also referred to as saturating inductor sensors. The latter are preferred as combining high resolution, high sensitivity, operation over a relatively large range of field strength and a good polar (directional) response. Saturating core sensors normally comprise a coil wound solenoid-like on an axially-extending core. The sensitivity can be selected by selection of the number of coil turns. As already mentioned and as will appear in the embodiments discussed below, an advantage of saturating core sensors is that a plurality of sensors can be connected (in series) into a single SCSP circuit in additive or/and subtractive fashion. However, sensors can be connected into separate SCSP circuits if required or preferred and the outputs of the individual circuits combined in the required manner in an overall circuit arrangement from which a desired displacement (position)-representing signal is obtained.

Figure 6A:
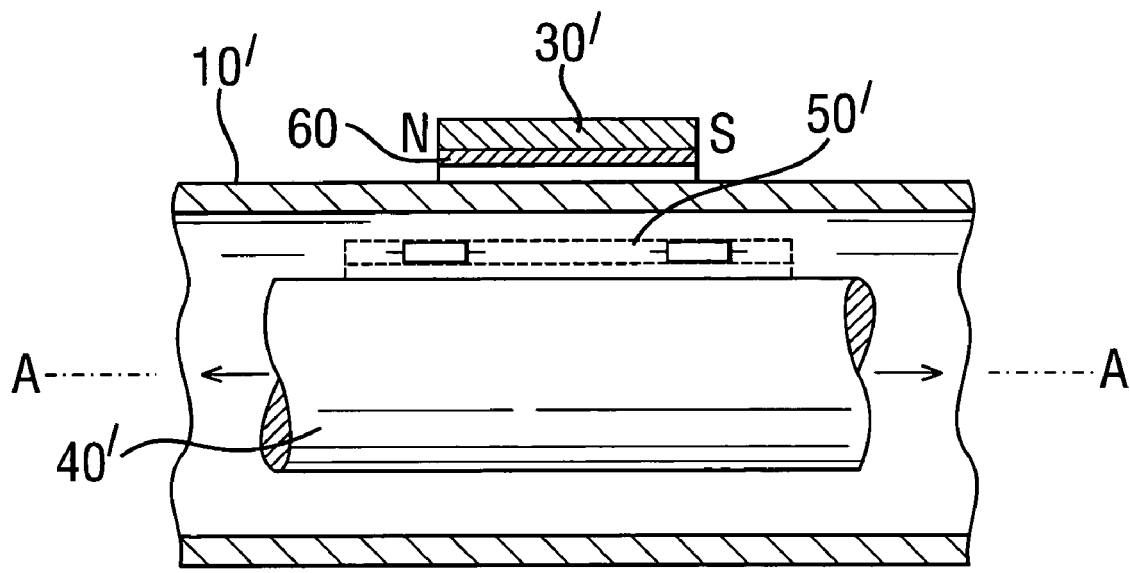
FIGS. 6a and 6b show an axial and a partial end view respectively of a preferred magnetic source structure.
Figure 6B:
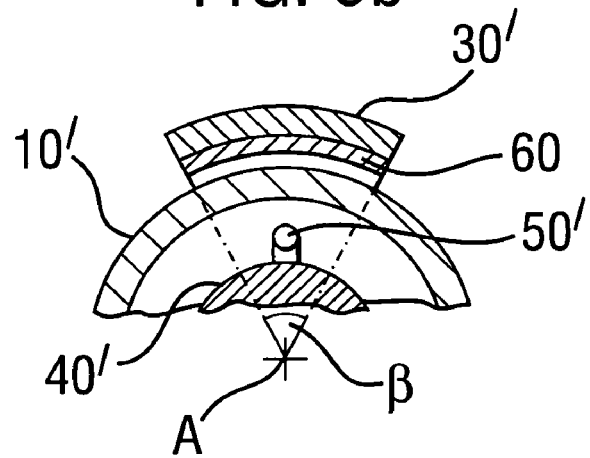

Referring now to FIGS. 6a and 6b these figures illustrate another measure that can be taken to adjust the value of magnetic field to which a sensor device or devices responds. The figures show a tube 10' of circular cross-section outwardly of which is mounted a magnet 30'. Within the tube, part 40' is mounted to be movable in the axial direction A-A relative to tube 10'. Mounted to the part 40' is a magnetic sensor device assembly 50', the axis of maximum sensitivity of each individual device being axially-directed.

The magnet 30' is a permanent magnet having its poles N-S oriented in the axial direction, but it has an arcuate shape in the circumferential direction about axis A-A. This is of benefit where the movement of the part 40' relative to tube 10' may entail angular displacement between the magnetic source 30' and the sensor assembly 50', or even allow for some degree of angular misalignment. For example the magnet of a given radius r may subtend an angle β of ±5° with respect to the position of sensor 90 assembly 50' about the axis.

The arcuate magnet 30' is fixedly mounted relative to the tube 10'. The magnet is supported on an arcuate plate 60 of a ferromagnetic material, for example attached by an adhesive. The plate 60 may be inward of the magnet as shown or outward of the magnet. Because the plate 60 is of ferromagnetic material it will provide a shunt path for magnetic flux generated by the magnet which in turn will affect the strength of the magnetic field which permeates the tube 10' to affect the sensor assembly 50'. The plate may be shaped to determine the reluctance of the shunt path which it provides. The plate 60 could be provided by appropriately plating the inner or outer surface of the arcuate magnet with a ferromagnetic material.

The use of an arcuate magnet to allow for some degree of angular movement can be applied to a radial magnet. Field strength adjustment of the kind discussed would need to be applied along one or more radial surfaces of the magnet. In general it has been found better to maintain the sensed field small commensurate with adequate signal-to-noise ratio.

Attention will now be given to various configurations of magnetic source and magnetic field detector. In the examples described below, the magnetic source comprises a single magnet: the magnetic field detector comprises a single sensor device to demonstrate the basic response characteristic, and as is preferred, a plurality of sensor devices from which a combined transfer function is obtained. The transfer function can be expressed in a volts output per millimeter of displacement form (V/mm). The transfer function should be as linear as possible over a range of displacement though deviations from linearity can be compensated for as discussed above.

In FIGS. 7a, 8a, 9, 12, 17, 18 and 23 the tube wall or separator is denoted 10. The magnetic source comprises a magnet 30 or 30' for an axial or radial magnet respectively and the magnetic field detector assembly 50 comprises a single sensor device 50 or a plurality of sensor devices 51, 52 . . . and so forth. The devices are axially-oriented in t he direction of axis A-A unless marked with a prime indicating devices oriented normally to axis A-A, i.e. radially as illustrated.

In these figures the axial direction is horizontal and is indicated by arrows A-A. It will be assumed that the tube and detector assembly is fixed and the magnet 30 or 30' is movable in the direction A-A to effect relative movement between the magnetic source and the detector assembly. In most applications it will be more practical to mount the magnet to a movable part while mounting the detector assembly of interconnected sensor devices to a fixed part.

Various configurations of magnet and sensor device orientations will now be considered.

Axial Maqnet—Axial Sensors

Figure 7A:
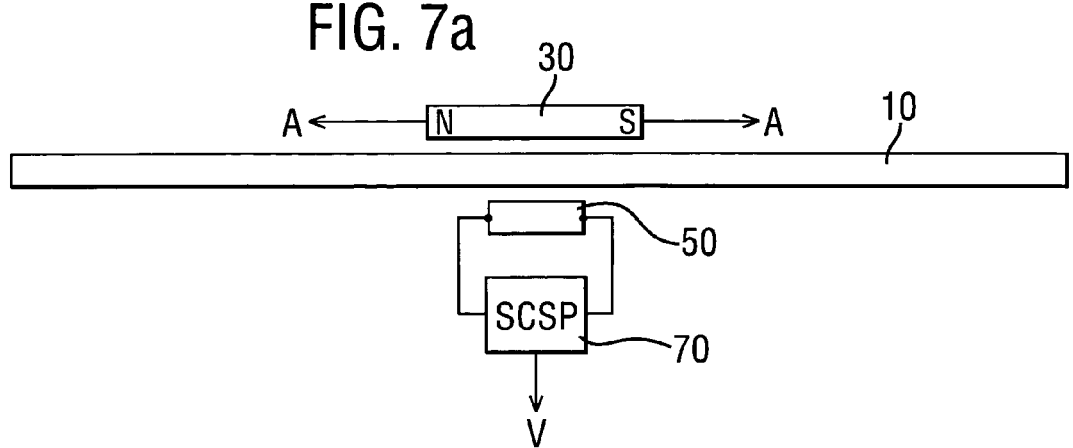
FIGS. 7a and 7b illustrate a first transducer configuration having an axially oriented magnet and axially-oriented sensor device and the response pertaining thereto respectively.

FIG. 7a shows a magnet 30 whose magnetic field permeates a separator wall 10 to be detected by an axially-oriented sensor device 50 connected into an SCSP circuit 70. The circuit 70 generates an output voltage proportional to the axial component of the magnetic field detected by device 50. The axially-oriented magnet 30 is of large aspect ratio with axially spaced poles N-S. Typically the magnet is of 12-20 mm length, 10 mm width and 3 mm depth. The axially-oriented sensor device 50 is a few millimeters long and typically about 2 mm diameter.

Figure 7B:
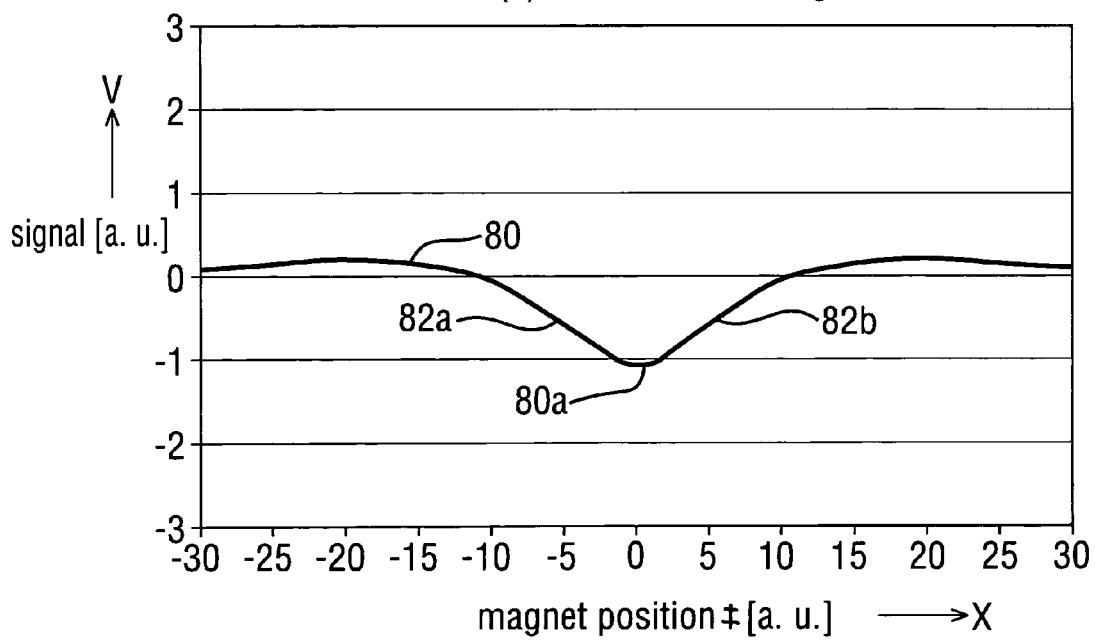

FIG. 7b shows the output V of the circuit 70 in arbitrary voltage units on the ordinate axis as a function of the position x of the magnet 30 along the A-A axis of FIG. 7a. The position on the abscissa axis of FIG. 7b is also in arbitrary distance units, typically in millimeters for the part dimensions given above. The zero position is where the magnet 30 is centred in line with the sensor device 50. There is no particular significance in the polarity of the response curve 80 of FIG. 7b. It comprises a central maximum or hump 80a bounded by two slope portions 82a and 82b of opposite slope and each extending over a limited range of displacement. The magnet's external field is predominantly axial along the length of the magnet with a maximum value at the centre. The field becomes essentially radial near the ends of the magnet, which is 20 mm long, before starting to reverse polarity beyond the ends. This basic form of response may be referred to as a hump type of response. Although the slope portions may individually be used so as to provide a measure of displacement over a limited range, by using plural sensor devices a more useful response curve can be obtained. This hump response can be transformed to a linear slope response by using plural spaced sensor devices as will now be described. In discussing the spacing of a plurality of devices, spacing centre-to-centre will be meant. Furthermore, where the plurality comprises more than two devices and a direct sequence of devices is referred to this means a continuous uninterrupted sequence of devices as may be combined in a group of various configurations described below.

Figure 8A:
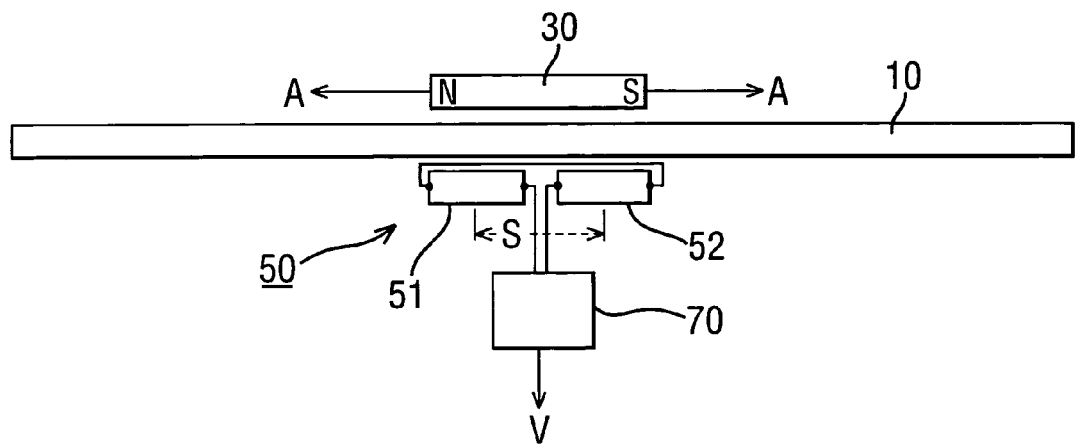
FIGS. 8a and 8b illustrate a transducer configuration having an axially-oriented magnet and two axially-oriented sensor devices connected in subtractive fashion, and the response pertaining thereto respectively.

Turning now to FIG. 8a, the sensor assembly comprises a pair of axially-spaced, axially-oriented sensor devices 51 and 52. The sensor devices are spaced centre-to-centre by a distance S and connected subtractively (differentially) in series to SCSP circuit 70.

Figure 8B:
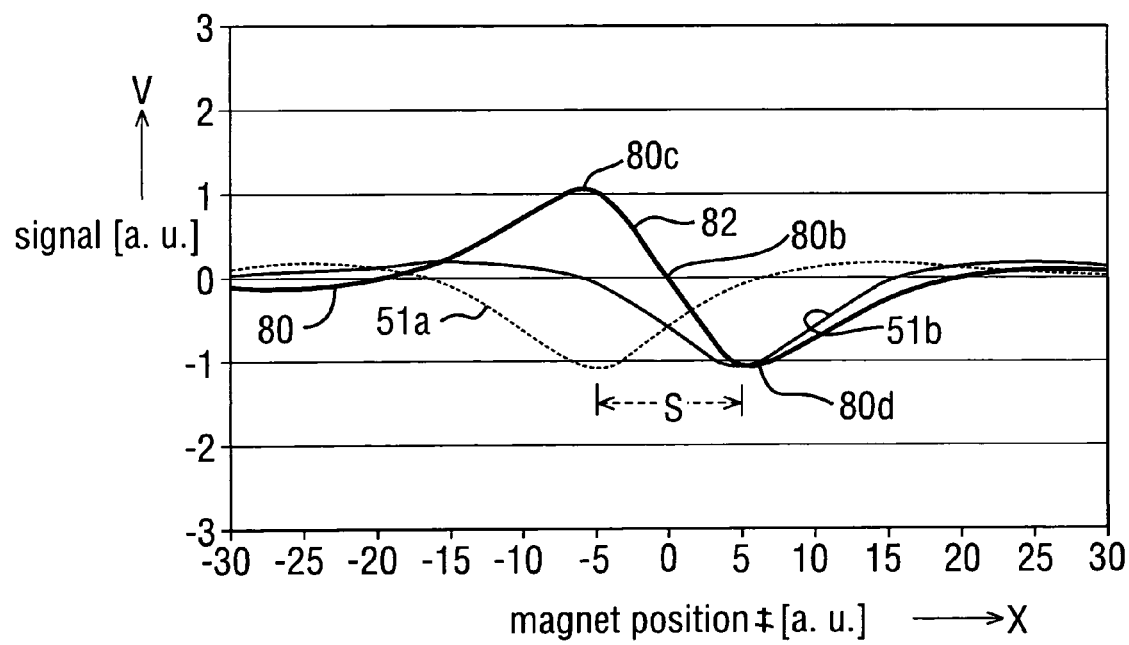

Fig. 8b shows the resultant response 80. The zero position is where the centre of the magnet aligns with the centre of the sensor assembly 50, i.e. mid-way between sensors 51 and 52. The responses of the individual sensor devices are indicated as 51a and 51b respectively—that is with each device connected individually into circuit 70 with the same polarity. The curves are identical but axially offset by the spacing S. Each response is of the hump type. Curve 80 shows the combined response with the sensor devices differentially connected. The curve exhibits a central zero point 80b between two maxima 80c and 80d of opposite polarity between which extends a generally linear slope portion 82 which is centred on point 80b and which provides the basis of a useful linear transducer transfer function of output voltage V as a function of x-axis position or displacement.

An important feature of the sensor assembly of FIG. 8a is that the subtractive connection of the two sensor devices results in cancellation of a common axial component of an external field such as the Earth's magnetic field.

Figure 9:
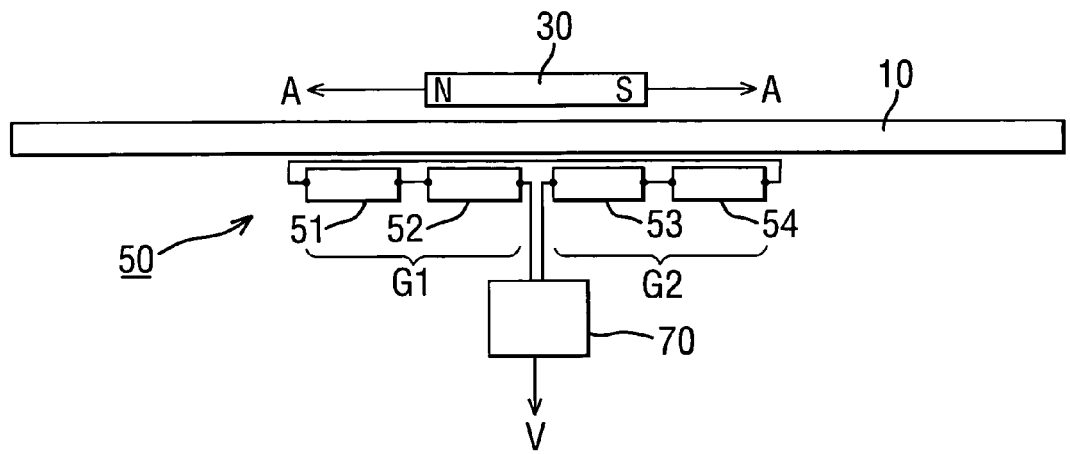
FIG. 9 illustrates a transducer configuration similar to FIG. 8a with four sensor devices connected in two groups of two devices each.
Figure 10:
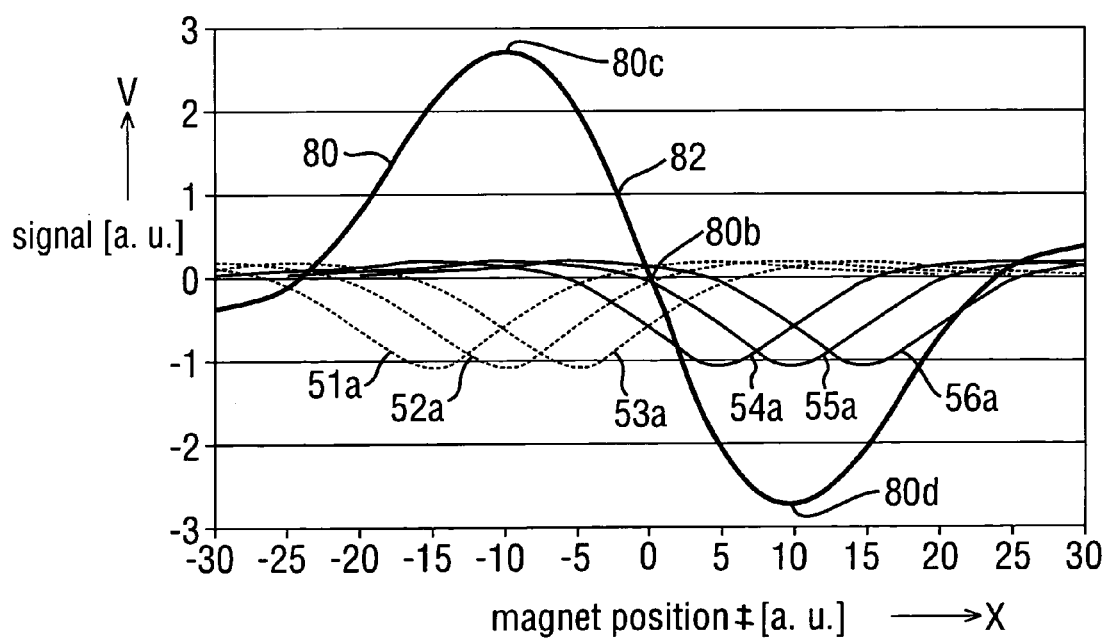
FIG. 10 shows the response pertaining to an extension of the transducer configuration of FIG. 9 to six sensor devices connected in two groups of three devices each.
Figure 11:
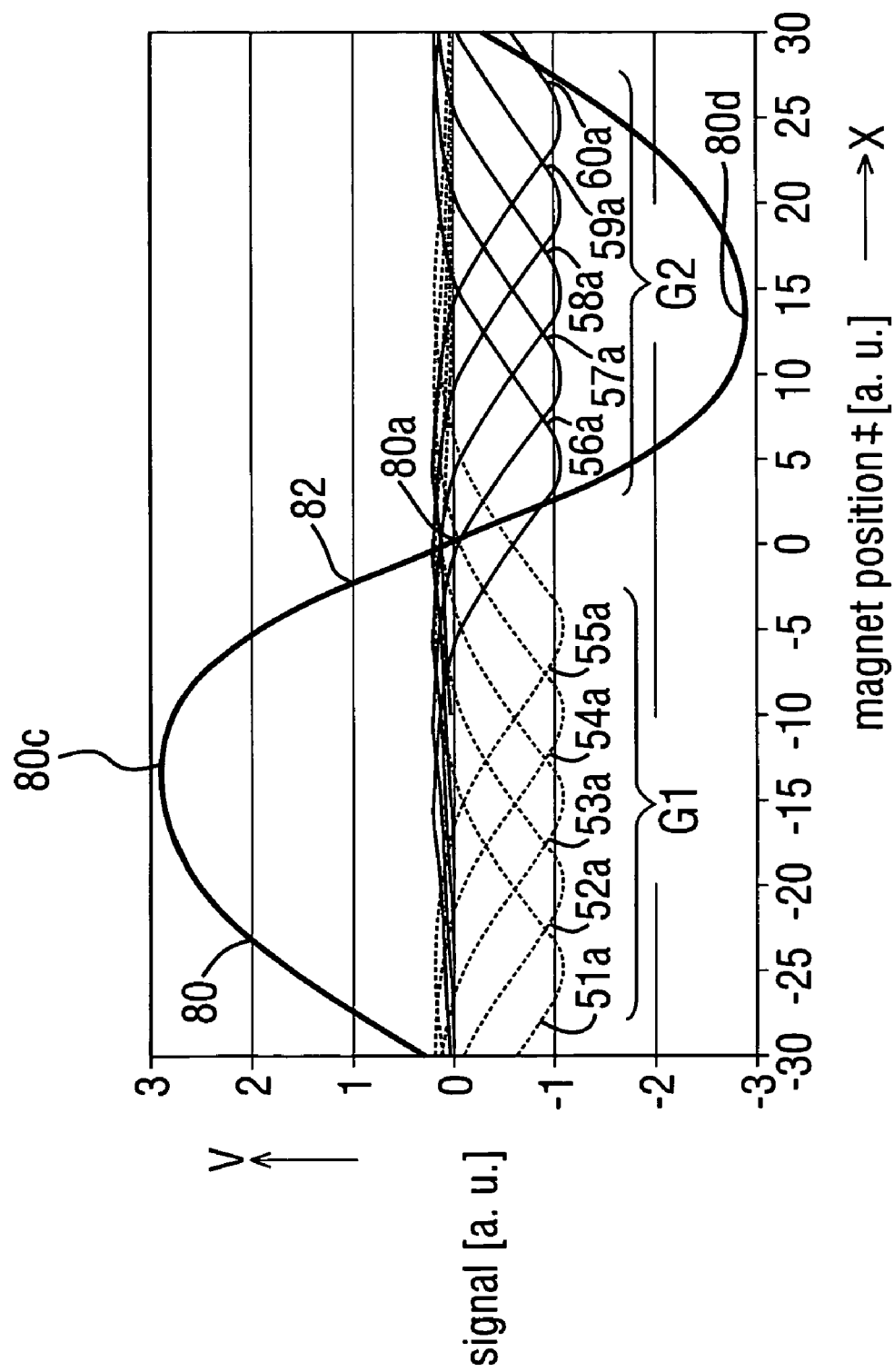
FIG. 11 shows the response pertaining to an extension of the transducer configuration of FIG. 10 to eight sensor devices connected in two groups of four devices each.

This concept can be taken further as is exemplified in FIG. 9 which shows the sensor assembly 50 expanded to four equally-spaced sensor devices 51-54 connected in two groups G1 (51 and 52) and G2 (53 and 54). In each group the two devices are connected additively but the two groups are connected subtractively. This results in the cancellation of a common external magnetic field component in the axial direction. Such a result can be achieved generally by having an even number of sensor devices divided into two equal groups. The groups do not have to be symmetrically arranged as in FIG. 9 for cancellation but the distribution of the groups of sensor devices will determine the overall combined response. The response curve pertaining to FIG. 9 is not illustrated but FIGS. 10 and 11 illustrate the response curves for cases where the sensor assembly of FIG. 9 is expanded to six and ten sensor devices connected as two symmetrical groups G1 and G2 of three and five devices each respectively. The devices in each group are equispaced but there is a slightly greater spacing between the device of group G1 next adjacent group G2 and the device of group G2 next adjacent group G1. It is not necessary that the devices with a group are equispaced but it has been found highly beneficial to have the two groups in a symmetrical configuration, i.e. G1 and G2 are symmetrical, whatever the spacing between the groups. The sensor devices within a group form a director or uninterrupted sequence along the axis A-A and are connected additively but the two groups are connected subtractively. The result is to transform basic hump-type responses into linear slope portion responses.

The following can be seen from a comparison of FIGS. 8b, 10 and 11. The two maxima 80c and 80d of FIGS. 10 and 11 are farther spaced apart than the maxima of FIG. 8b and are significantly greater in magnitude with a corresponding enhancement of the distance range of the linear portion 82. While the maxima of FIG. 11 are broader than those of FIG. 10, the distance range of the linear portion is not significantly different. The sensitivity of the sensor assembly is also greater for FIGS. 10 and 11 than for FIG. 8b, expressing sensitivity as output volts per unit distance of displacement (V/mm).

Sensor device configurations based on FIG. 9 using equal numbers of sensor devices in each of two groups, are of especial value where cancellation of a common external axial magnetic field component is required.

Axial Magnet—Radial Sensors

Figure 12:
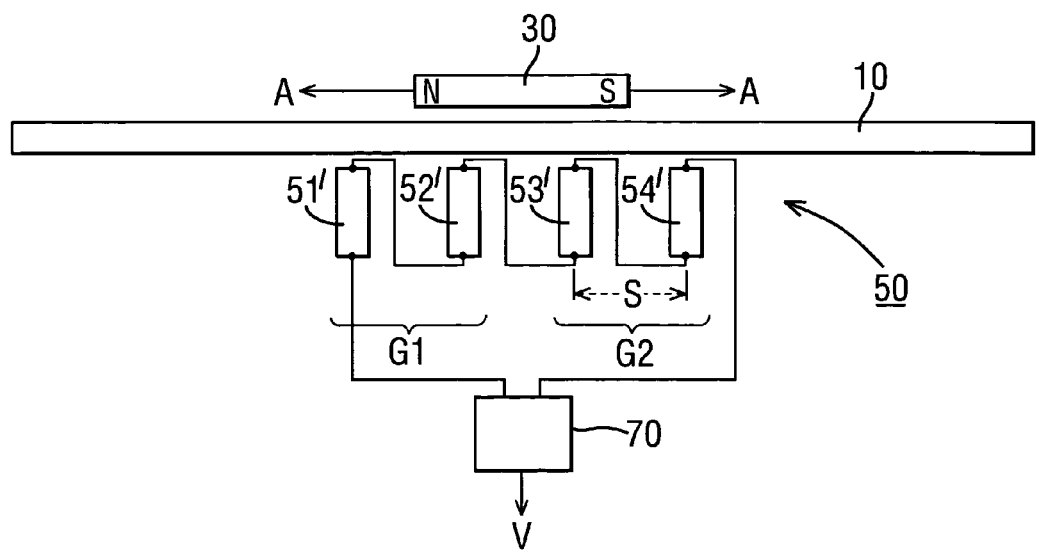
FIG. 12 illustrates a second transducer configuration having an axially-oriented magnet and a plurality of radially-oriented sensor devices.
Figure 13:
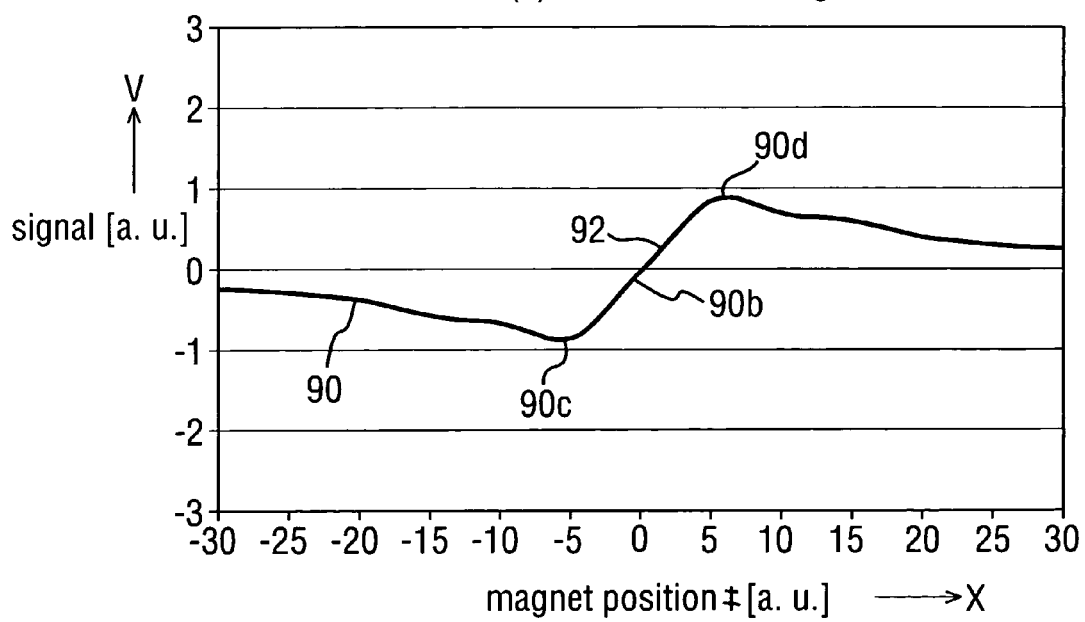
FIG. 13 illustrates the response pertaining to a single one of the sensor devices of FIG. 12.
Figure 14:
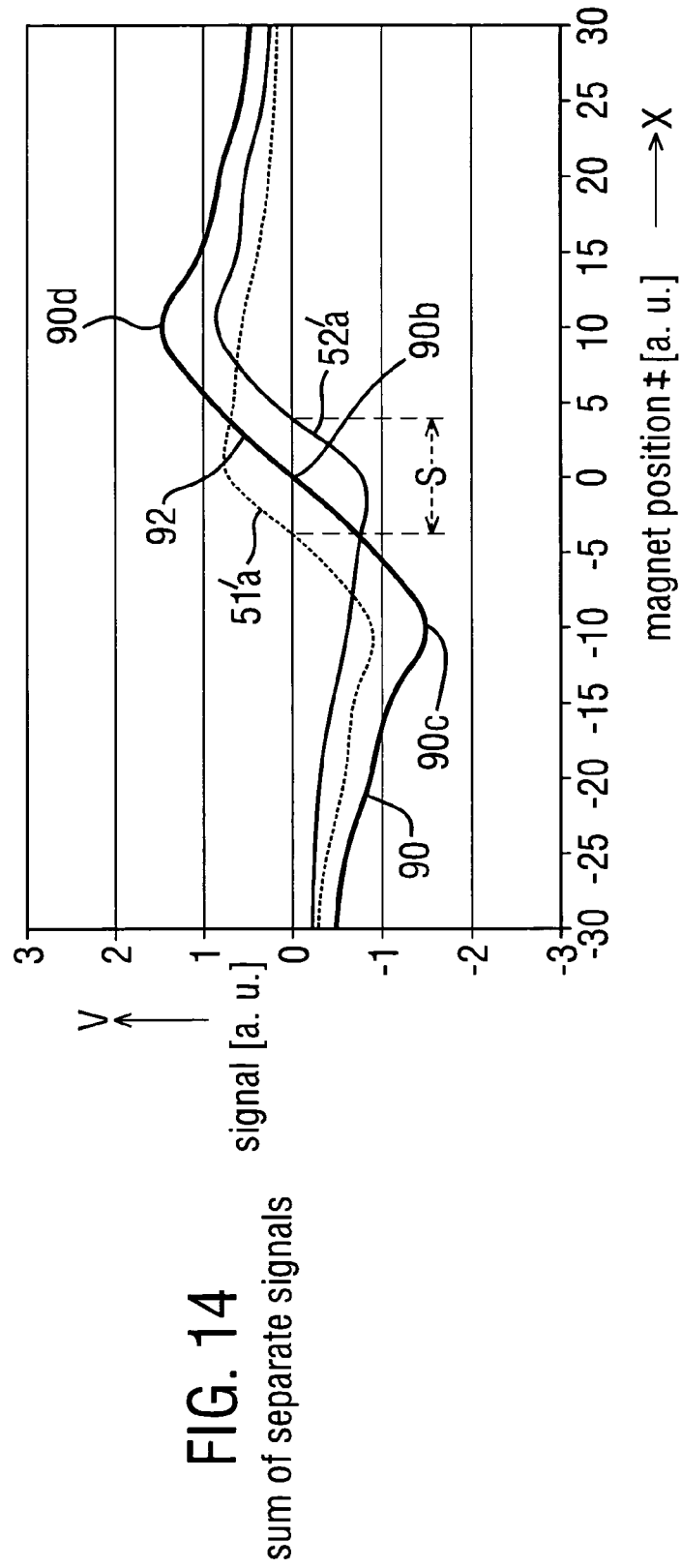
FIG. 14 illustrates the response pertaining to an adjacent two of the sensor devices of FIG. 12 connected additively and FIG. 14a shows the interconnection of the devices.
Figure 14A:
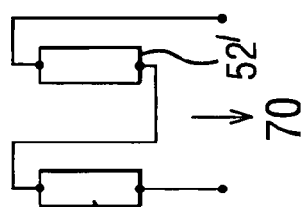

The configuration of the transducer illustrated in FIG. 12 maintains the axially-oriented magnet 30 but uses a plurality of radially-oriented sensors. The configuration of FIG. 12 is that of FIG. 9 but with the four sensor devices denoted 51'-54' oriented radially, that is normal to the axis of movement. FIG. 13 shows the basic response curve 90 for a single sensor device connected to SCSP circuit 70 where the zero on the x axis is where the magnet aligns centrally with the single sensor device. By comparison with FIG. 8b it is seen that response curve 90 has a zero crossing 90b at the zero position point bounded by two maxima 90c and 90d of opposite polarity and joined by a portion 92 of generally linear slope extending through point 90b. The shape of this response may be referred to as the basic linear slope—zero crossing response and the general shape is somewhat reminiscent of the more useful combined response of FIG. 8b. Extension of this configuration to two sensor devices is illustrated in FIG. 14 which shows the individual response curves 51'a and 52'a for the two sensor devices spaced by a distance S. The interconnection of the two devices is indicated in FIG. 14a. The devices are additively connected (summed) to give the resultant response 90 which has a linear slope portion 92 of enhanced distance range and of enhanced sensitivity.

It will be understood that radial sensor devices cannot provide cancellation of an external axially-directed magnetic field. Plural radial devices can be interconnected to provide cancellation of an external radially-directed magnetic field that is aligned with a common radial direction of maximum sensitivity of the devices. The interconnection of FIG. 14a does not afford such cancellation.

As will appear from the responses of sensor devices utilizing greater numbers of radial sensor devices significantly enhanced linear transfer functions can be obtained with regard to the range of displacement covered. On a practical installation level radially-mounted sensor devices may be more difficult to reconcile with the physical space available than axially-mounted devices.

FIG. 15 shows the overall response of a sensor assembly having four radially-oriented sensor devices 51'-54' connected in additive series as shown in FIG. 12. The individual device responses 51'a-54'a are shown. From these responses it will be seen that the devices are spaced by a distance S along the axis. They can be regarded as being in two groups G1 and G2 to one side and the other of the zero position point. What is noticeable in FIG. 15 is the enhancement of the range of combined linear response 92 compared to FIG. 14.

This range of enhancement of linear response 92 is further increased in the response curve 90 of FIG. 16 pertaining to six spaced, radially-oriented sensor devices connected in additive series. The individual responses are shown as 51'a-56'a. Comparing FIGS. 14, 15 and 16 the progressive enhancement of the linear range of a usable transfer function is accompanied by a progressive reduction in the slope of the linear portion, or the "gain" associated with the transfer function.

Radial Magnet—Axial Sensors

Two magnet configurations are possible: a) large aspect ratio; b) small aspect ratio.

FIG. 17 shows a transducer using radial magnet 30' of large aspect ratio for co-operating with a sensor assembly 50 using four axial magnets 51-54. FIG. 17 is similar to FIG. 3 but the magnet 30 is oriented in a radial position. No response curve is shown for the configuration of FIG. 17. The basic response of a single sensor device can be expected to be of the same general form as seen in FIG. 19 but with a much reduced linear slope portion.

Another radial magnet configuration is shown in the transducer of FIG. 18. Here the radial magnet 30" is of small aspect ratio and the axial width of the magnet is substantially greater than the axial length of a sensor device. FIG. 19 shows the basic response curve 100 for the axial displacement of the magnet 31" with respect to a single one of axial sensor devices 51-54 connected into an SCSP 70).

The response curve 100 shows a linear slope portion 102 passing through a zero crossing 100b between two maxima 100c and 100d. It has been found that this linear slope is of very good linearity, i.e. of constant slope. Keeping in mind that magnetic field lines enter or emerge from a ferromagnetic surface perpendicularly to that surface, zero crossing point 100*b* is consistent with this and with the magnetic flux being concentrated in the vicinity of the corners of the magnet. The magnetic flux is in opposite directions adjacent the corners of the South surface. The axial distance between maxima 100*c* and 100*d* is approximately the axial width of the magnet, 20 mm in the example.

Figure 20:
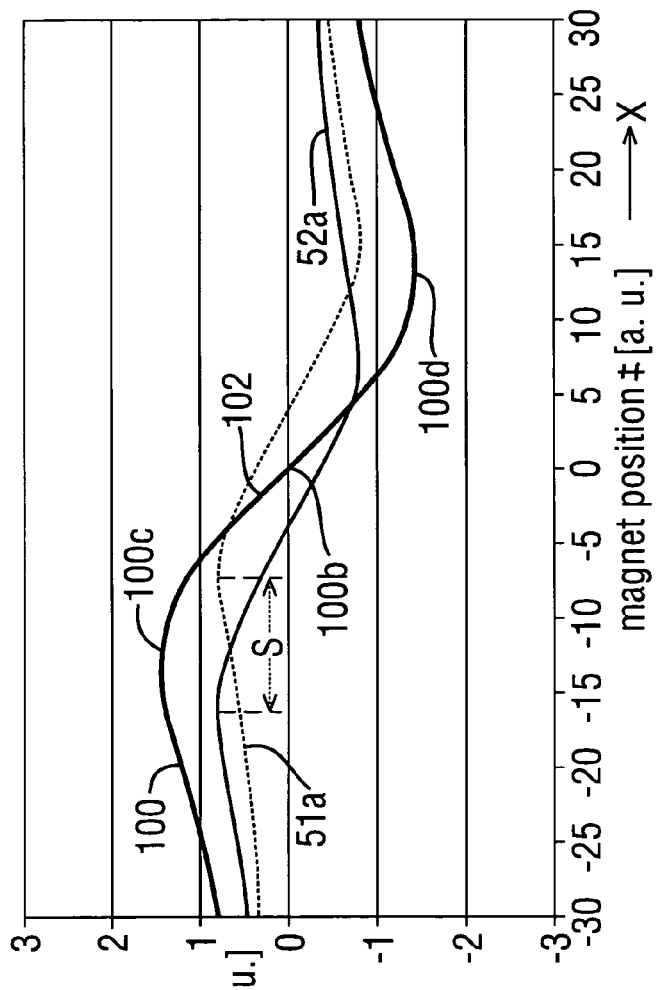
Figure 20A:
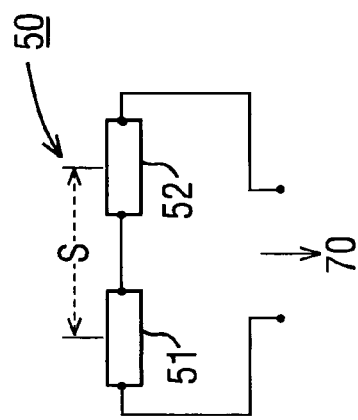

FIG. 20 shows the response curve when the sensor assembly 50 is extended to two sensor devices 51, 52 additively connected as in FIG. 20*a*. The individual responses are indicated as 51*a*, 52*a*. The devices are spaced by a distance S.

The combined response 100 shows no significant range enhancement of the linear slope portion 102 over FIG. 19 though it is of higher gain (greater slope). However, when all four sensor devices 51-54 of FIG. 18 are connected in additive series as shown in the figure, an appreciable enhancement of range is seen in the response of FIG. 21; and still further when the sensor assembly is extended to six spaced, axially-oriented sensor devices, all connected additively in series. The six responses 51*a*-56*a* are shown in FIG. 22, adjacent individual responses spaced by a distance S along the axis combine to provide a linear slope portion 102 of high linearity and gain.

The transducer configuration of FIG. 18 of a small aspect ratio radial magnet and a plurality of axially-oriented sensor devices is presently considered to be particularly advantageous, for range of linear response, especially in the six sensor device version. However, it does not provide cancellation of an external axial magnetic field.

Radial Magnet—Radial Sensors

Figure 23:
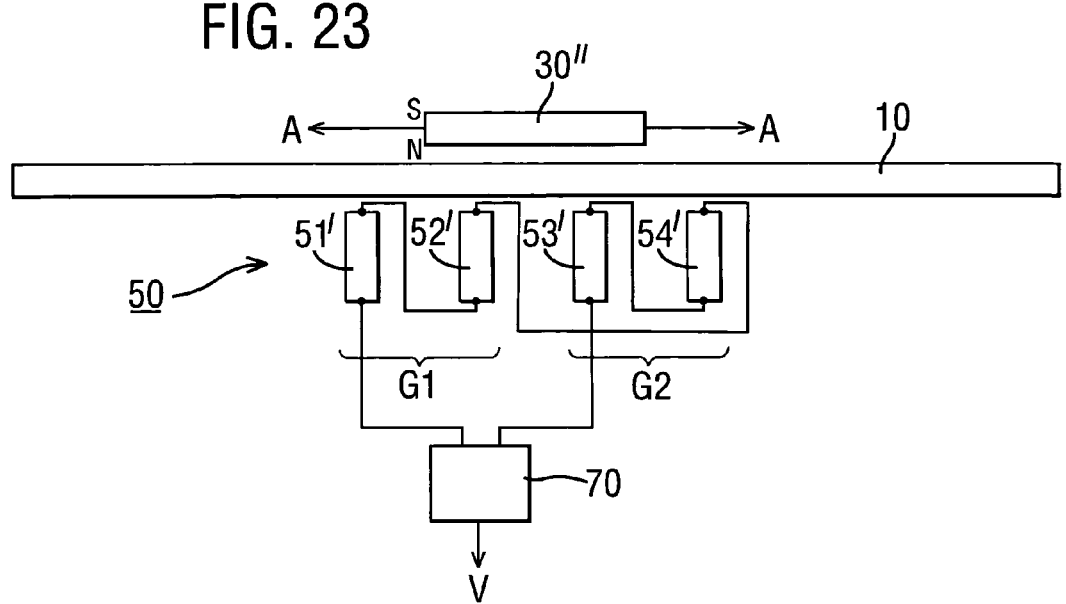
FIG. 23 illustrates a fourth transducer configuration using a radially-oriented magnet of small aspect ratio and a plurality of radially-oriented sensor devices.
Figure 24:
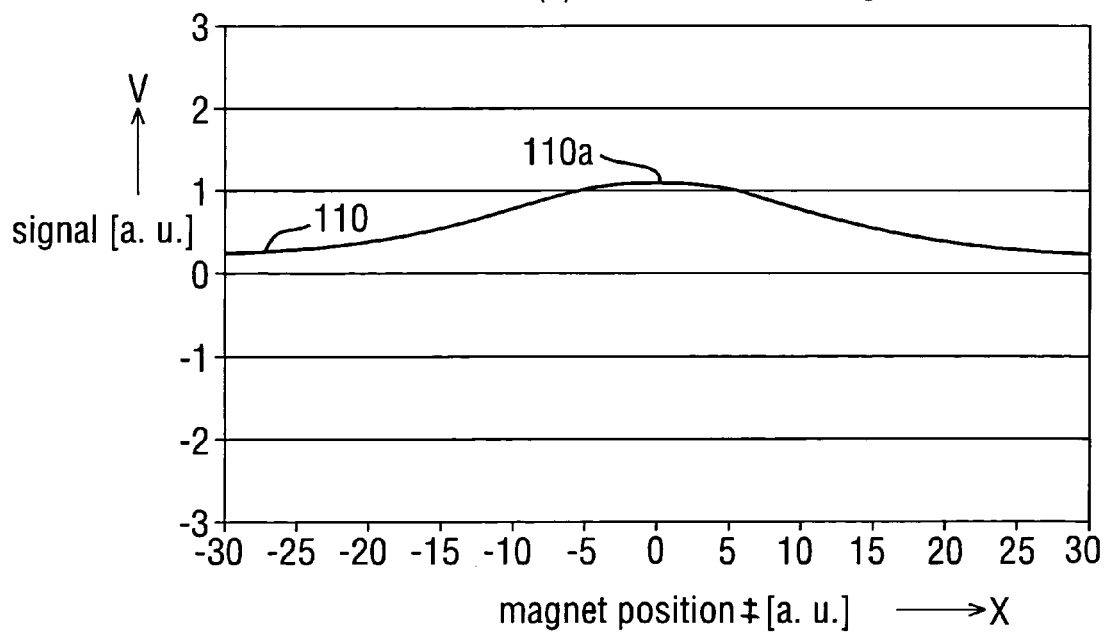
FIG. 24 illustrates the response pertaining to a single one of the sensor devices of FIG. 23.

Another configuration for a transducer is that illustrated in FIG. 23 in which a radially-oriented magnet is used in co-operation with a sensor assembly 50 of radially-oriented sensor devices. FIG. 23 specifically illustrates a configuration using a radial magnet 30" of small aspect ratio. FIG. 24 shows the basic response with one sensor device while FIGS. 25-27 relate to sensor assemblies using 2, 4 and 6 sensor devices respectively.

FIG. 24 shows the response 110 of a single sensor device 50 connected into an SCSP circuit 70. It is of a single polarity. The response is shallow having a broad maximum 110*a* falling gradually away toward zero with increasing distance x from the zero position. This may be categorized as a hump-type of response and can be transformed to a response having a linear slope portion with a zero crossing by including a subtractive combining of contributions from a plurality of sensor devices, either a subtractively connected pair of devices or two subtractively connected groups of devices in which the devices within a group are connected additively. This follows the teaching of the Axial Magnet Axial Sensors given above.

Figure 25:
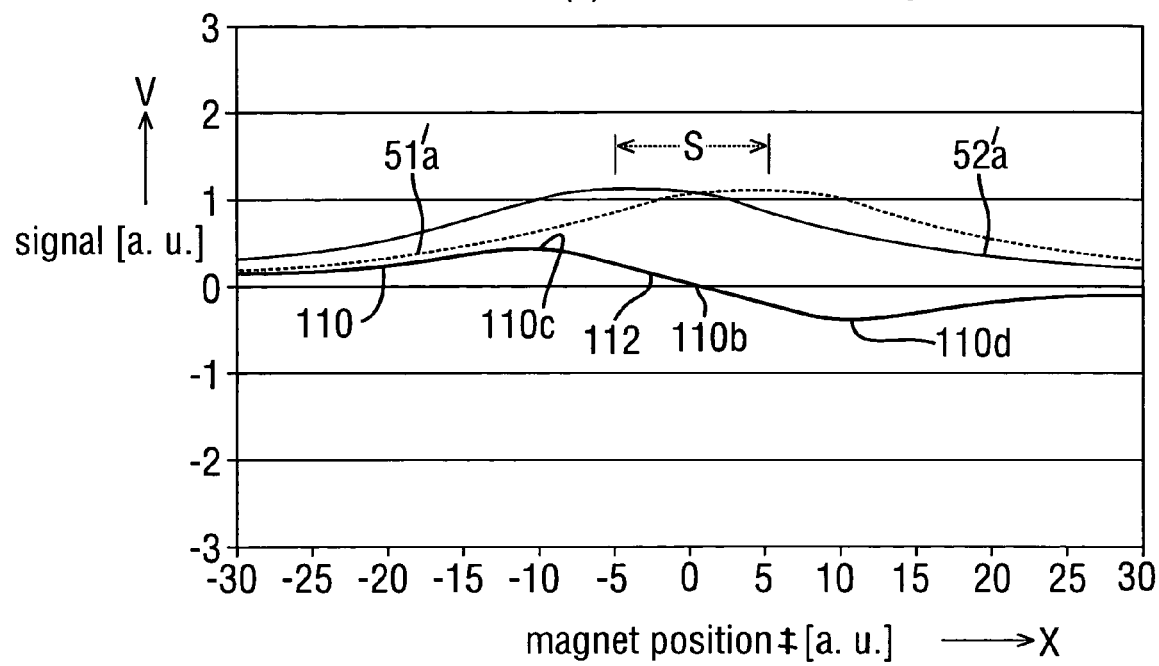
Figure 25A:
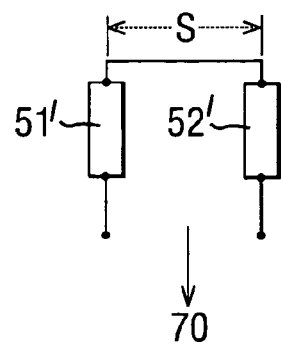

FIG. 25 shows the overall response 110 of two sensor devices 51'-52' spaced by a distance S and connected in subtractive series as indicated in FIG. 25*a*. The individual responses are shown as 51'*a* and 52'*a* and are like that of FIG. 24 being of a single polarity of the hump type. These responses are transformed into a combined overall difference response 110 which exhibits a linear portion 112 passing through a zero crossing 110*b* between two moderate peaks 110*c* and 110*d* of opposite polarity.

Figure 26:
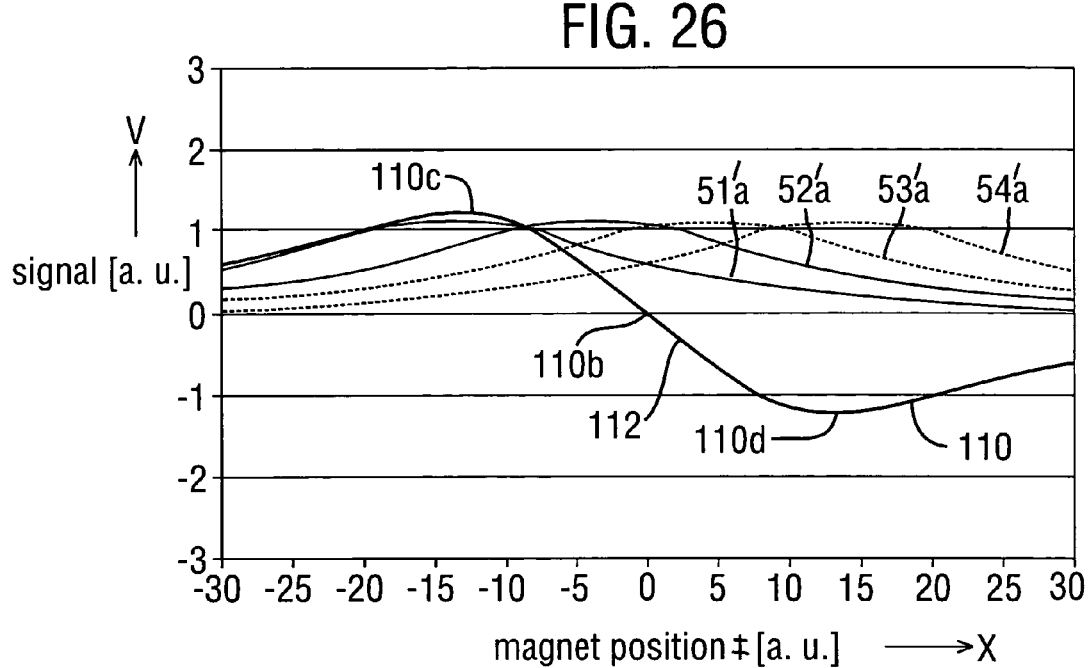

FIG. 26 relates to the configuration shown in FIG. 23 in which the four radial sensor devices 51'-54' are connected in two groups G1 and G2 symmetrical about the zero position. The individual responses are indicated on FIG. 25 as 51'*a*-54'*a*. Devices 51' and 52' of group G1 are connected in additive series as are devices 53' and 54' of group G2. However the two groups are connected subtractively. The resultant overall response 110 has an enhanced portion 112 of linear slope as compared to FIG. 25 and also of greater slope—a higher gain transfer function.

Figure 27:
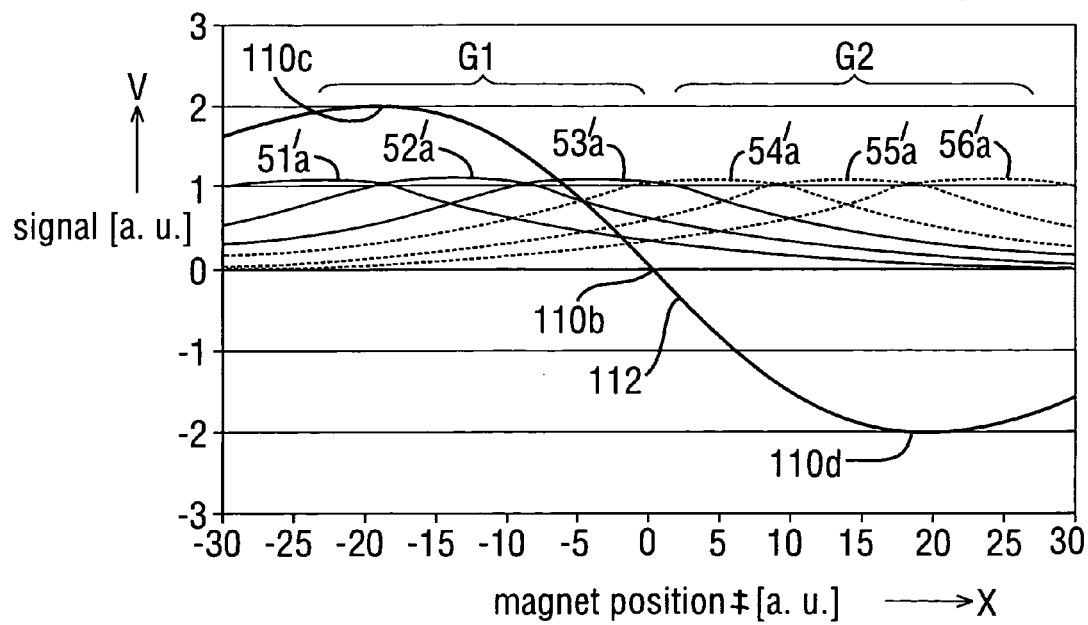

FIG. 27 takes the arrangement of FIG. 23 a step further in that each group G1 and G2 now comprises three sensor devices in a direct sequence along the axis A-A and connected additively while the groups are connected subtractively. The individual sensor responses are denoted 51'*a*-53'*a* for group G1 and 54'*a*-56'*a* for group G2. The distance range of the linear portion 112 is further enhanced as is the slope value.

SUMMARY

Some general conclusions can be expressed in relation to the transducer configurations discussed above.

1. A single sensing device oriented in the same direction as the magnet produces a hump type of response.
2. For a plurality of sensing devices oriented in the same direction as the magnet, the hump type of response pertaining to each device can be transformed to have a linear slope portion by employing a subtractive combining of two devices or of two groups of devices where the plurality comprises more than two devices. The devices within a group can be additively combined.
3. A single sensing device oriented normal to the direction of the magnet produces a response having a linear slope portion.
4. For a plurality of sensing devices oriented in a direction normal to the magnet, the linear slope portion pertaining to each device can be enhanced by additively combining the contributions of the plurality of devices.
5. Where the orientation of the sensing devices is normal to the magnet orientation, it can be expected that the output (V/mm) is less than if the two orientations are aligned. On the other hand, the potential for an extended range of overall linearity looks to be better for the normal orientations.

When practising the invention to "see through" an intervening tube or other separator wall of ferromagnetic material, the remanence of the separator is preferably low and the magnetic field maintained at a low value commensurate with adequate measurement sensitivity. This is to avoid the creation of regions of the separator imbued with remanent or residual magnetisation.

In one or more of the above-described preferred embodiments, the sensing device(s), for example, the coils of saturating core type sensors, may be potted or encapsulated in a compound or embedded in a circuit board with an outlet plug extending therefrom.

In the various response curves illustrated in the drawings, the relative magnitudes of responses, as between different kinds of magnetic source/sensor device orientations, are not necessarily an indication of relative sensitivities. Other scale adjustment may have been made to allow for the different orientation-dependent sensitivity mentioned under point 5. above.

The invention claimed is:

1. A transducer for measuring a displacement along an axis of movement of a first part relative to a second part, consisting of:
    a magnetic source for generating a magnetic field consisting of a single magnetic device mounted to the first part having a single North and a single South pole in combination oriented in the direction of said axis of movement;
    at least two active magnetic field sensing devices mounted to the second part to be movable relative to the magnetic field, wherein said active magnetic field sensing devices are spaced in the direction of said axis, and wherein said at least two active magnetic field sensing devices are respective members of two groups of sensing devices; and a circuit arrangement to which said at least two active magnetic field sensing devices are connected, wherein the magnetic field sensing devices within a first group of the two groups of sensing devices are connected such that the polarity of an output response of all of the sensing devices of said first group to the magnetic field is the same, and wherein the devices within a second group of the two groups of sensing devices are connected such that the polarity of an output response of all the sensing devices of said second group to the magnetic field is the same, and wherein the polarity of an output response of one of said at least two active magnetic field sensing devices is opposite the polarity of an output response of at least one other of said at least two active magnetic field sensing devices when exposed to the magnetic field to generate an output signal dependent on the combined additive or subtractive contributions from all of said sensing devices.

2. A transducer as claimed in claim 1 in which the two groups contain the same number of sensing devices.

3. A transducer as claimed in claim 1 in which said sensing devices are in two groups, each group containing the same number of sensing devices, said sensing devices in each group being in direct sequence in the direction of said axis.

4. A transducer as claimed in claim 1 in which the magnetic source comprises a magnet having a large aspect ratio.

5. A transducer as claimed in claim 1 in which each of said sensing devices comprises a saturating core.

6. A transducer as claimed in claim 1 wherein the respective members of the two groups of sensing devices comprise at least a first active magnetic field sensing device adapted to measuring static magnetic fields having an axis of maximum sensitivity; and a second active magnetic field sensing device having an axis of maximum sensitivity, wherein said second active magnetic field sensing device is spaced apart from said first active magnetic field sensing device.

* * * * *